(12) United States Patent
Kim et al.

(10) Patent No.: US 8,891,700 B1
(45) Date of Patent: Nov. 18, 2014

(54) METHOD FOR DETECTING, CLASSIFYING, AND REDUCING INTERFERENCE IN WIRELESS NETWORKS

(71) Applicant: Mitsubishi Electric Research Laboratories, Inc., Cambridge, MA (US)

(72) Inventors: Kyeong-Jin Kim, Lexington, MA (US); Philip Orlik, Cambridge, MA (US); Ghulam M Bhatti, Mansfield, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/940,571

(22) Filed: Jul. 12, 2013

(51) Int. Cl.
*H03D 1/04* (2006.01)
*H03D 1/06* (2006.01)
*H03K 5/01* (2006.01)
*H03K 6/04* (2006.01)
*H04B 1/10* (2006.01)
*H04L 1/00* (2006.01)
*H04L 25/08* (2006.01)

(52) U.S. Cl.
CPC .................................. *H04B 1/1027* (2013.01)

USPC ....... 375/346; 375/285; 455/63.1; 455/67.13; 455/114.2; 455/296

(58) Field of Classification Search
USPC ................. 375/224, 227, 285, 346, 348, 350; 455/501, 63.1, 67.11, 67.13, 67.14, 455/114.2, 115.1, 115.2, 226.1, 296
See application file for complete search history.

(56) References Cited

U.S. PATENT DOCUMENTS

| | | | | |
|---|---|---|---|---|
| 6,115,409 | A * | 9/2000 | Upadhyay et al. | 375/144 |
| 6,122,309 | A * | 9/2000 | Bergstrom et al. | 375/130 |
| 7,379,724 | B2 * | 5/2008 | Nilsson et al. | 455/296 |
| 2010/0014616 | A1 * | 1/2010 | Coulson | 375/341 |

* cited by examiner

*Primary Examiner* — Jean B Corrielus
(74) *Attorney, Agent, or Firm* — Dirk Brinkman; Gene Vinokur

(57) ABSTRACT

Interference in a wireless network is detected by first applying during a detection stage a two-sample Kolmogorov-Smirnov (KS) test to samples obtained from a channel in the wireless network to obtain a KS statistic. When the KS statistic is larger than a predetermine threshold, it is determined that the samples include narrowband interference, and wideband otherwise.

7 Claims, 7 Drawing Sheets

METHOD FOR DETECTING, CLASSIFYING, AND REDUCING INTERFERENCE IN WIRELESS NETWORKS

FIELD OF THE INVENTION

This invention relates generally to wireless networks, and more particularly to detecting, classifying, and reducing interference in wireless local area networks.

BACKGROUND OF THE INVENTION

Wireless local area networks (WLAN) have shown improvements in throughput, and a significant drop in deployment costs. Offering flexibility and ease of deployment, WLAN are increasingly popular in residential, commercial, and industrial applications. However, wireless communications, being inherently unreliable, need significant improvements before these technologies can become a viable alternate to wired networks, especially for time-sensitive applications.

The main problem for wireless communication networks is interference. Interference can originate in other similar networks operating in a geographic vicinity and in the same or similar frequency bands or channels. Many existing wireless communication networks are allowed to operate in the same unlicensed frequency bands, and therefore interfere with one another. Some examples include Wi-Fi and Bluetooth (BT) devices, cordless telephone, smart telephones, etc., which operate in the 2.4 GHz or 5.8 GHz unlicensed industrial, scientific and medical (ISM) bands.

Interference may also come from non-communication sources such as microwave ovens, fluorescent light bulbs, and objects in the signal paths, which can causing shadowing and multi-path problems. Most of these factors are generally out of control for the operators of the WLAN. Therefore, the WLAN must be able to adapt to such environments by employing technologies that minimize the effect of interference.

The interference that affects the performance of a WLAN can be classified as wideband interference with a bandwidth of 20 MHz or more from other network devices, and narrowband interference signals, typically 1 MHz or less.

Frequency hopping can minimize the effect of interference by spreading the information signal over multiple frequency channels. Systems with orthogonal frequency division multiplexing (OFDM) and multiple-input multiple-output (MIMO) systems can provide reliable communications and increased throughput. Though these technologies have reduced the interference levels significantly, interference is still a major source of performance degradation for the WLAN.

The first step to minimize the effect of the interference is to detect the interference and classify its type, e.g., narrow or wideband or both. Appropriate actions such as changing the operating channel, transmitting during inactive periods of a periodic interference signal, etc., can then be devised. Doing that, however, consumes network resources and adversely affects performance. There must be a well-calculated trade-off between the resources that can be committed to deal with the interference and potential improvements gained in the performance.

However, most conventional methods focus only on an individual source of interference.

SUMMARY OF THE INVENTION

The embodiments of the invention provide a method for detecting and classifying interference in a wireless network as a narrowband, wideband signal, or a combination of both. Based on the classification, interference reduction techniques are then used to ensure an effective throughput.

The nodes in the wireless network scan the wireless channels for pre-specified scanning periods and produce fast Fourier transform (FFT) or equivalent values representing the wireless activity on the channel. These values are used to detect and classify the interference in a low-cost and efficient way. Given a data rate and desired effective throughput, the invention determines limits on a scan budget that can be used to achieve at least the desired throughput for the network.

Specifically, the method detects interference in a channel of a wireless network by first applying a two-sample Kolmogorov-Smirnov (K-S) test to first and second periodograms obtained during two consecutive scans of the channel to a obtain a first statistic. Then, the interference is classified as either wideband or narrow band by comparing the first statistics to a threshold. The interference is reduced according to the classifying.

DETAILED DESCRIPTION OF THE PREFERRED EMBODIMENTS

The embodiments of the invention provide a method for detecting, classifying and reducing interference in a channel of a wireless network.

Figure 1:
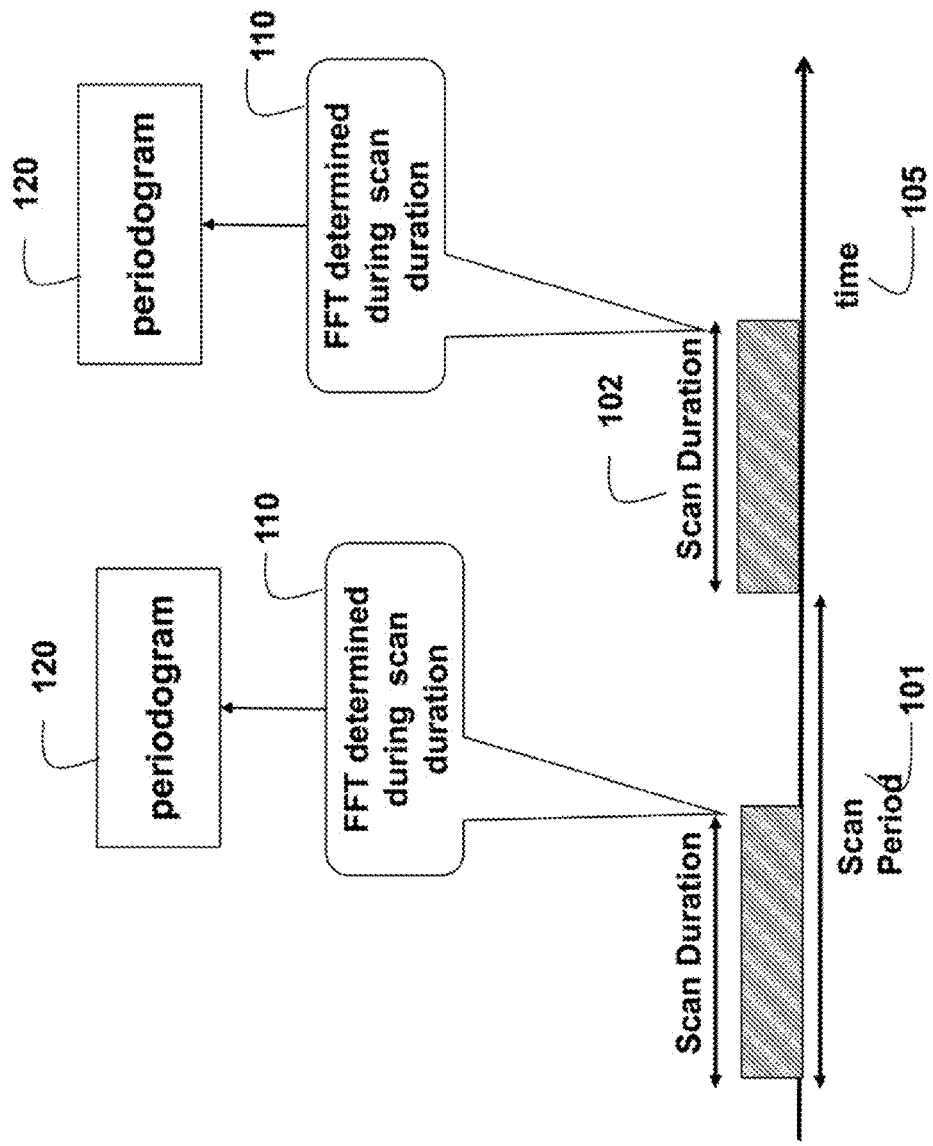
FIG. 1 is a schematic of a procedure for sampling a wireless channel according to embodiments of the invention.

As shown in FIG. 1, the first step in interference reduction detects the interference in a cost-effective way. Instead of trying to detect and classify individual interfering signals, the embodiments periodically detect changes in wireless activity on a channel during a scan period 101 over time 105. The detection occurs during a scan duration 102, which can be all or part of the period. If a significant change is detected, then a more thorough analysis of the interference activity is performed.

To detect the interference, the embodiments use magnitudes produced by a fast Fourier transform (FFT) 110. The magnitudes are in the form of periodograms 120, which are estimates of a spectral density of a signal similar to the FFT but optimized for unevenly time-sampled data. The periodograms can classify frequencies without requiring the knowledge of the type of interference. The scan duration and scan period have an effect on the quality of information contained in the periodograms. A longer scan duration generally results in better information about the activity occurring during the scan. More frequent scans, i.e., smaller scan periods, result in early detection of changes in the signal characteristics.

Figure 2:
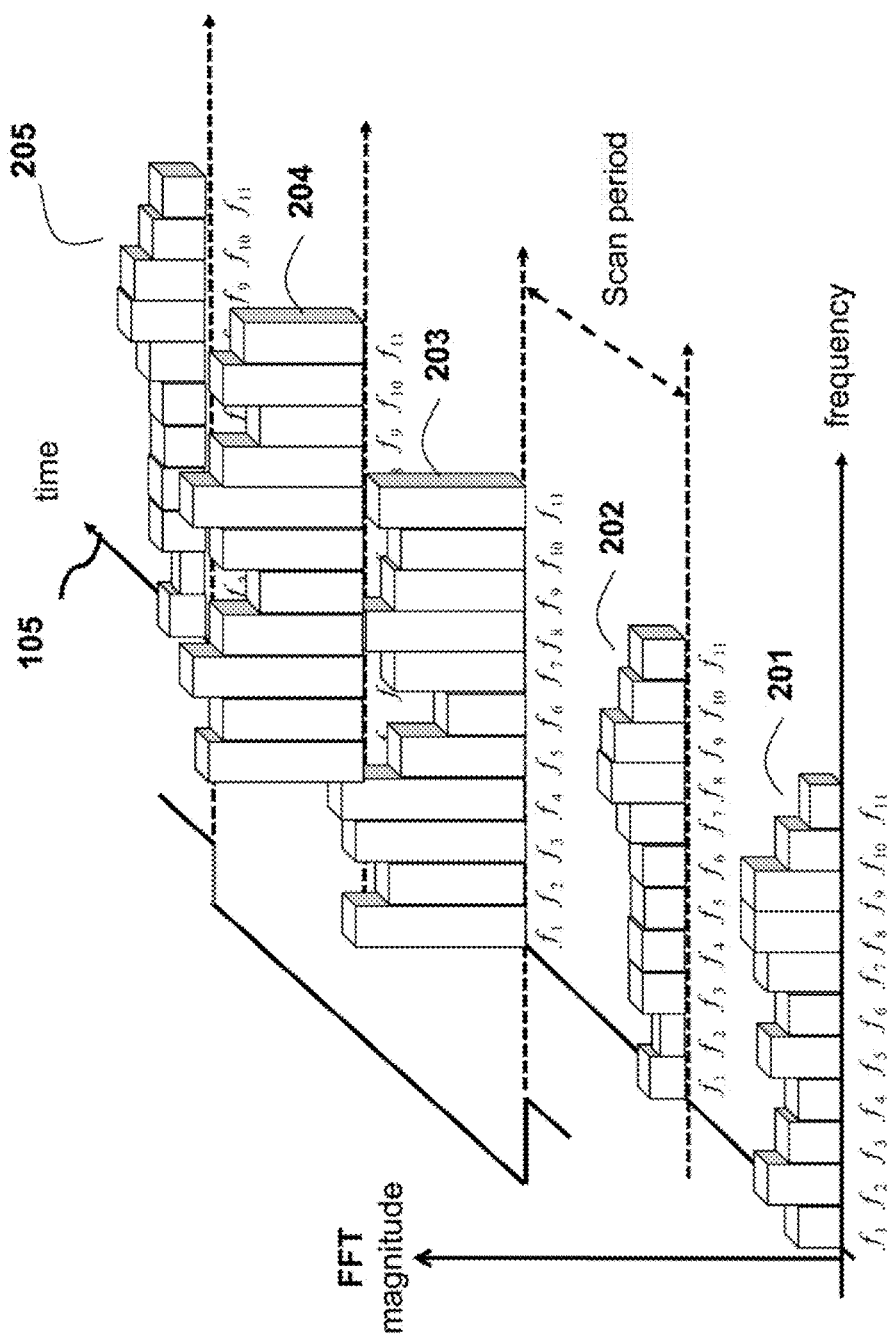
FIG. 2 is an example schematic of periodograms constructed from the sampling according to embodiments of the invention.

As shown in FIG. 2, 3D periodograms 201-205 can be generated during several scan periods for different frequencies $f_n$. The vertical axis indicates magnitudes, the horizontal axis indicated frequencies, and the diagonal axis indicates time. FIG. 2 shows significant changes in the periodograms over time. A 2-D plot of the periodogram is called a spectrograms. The spectrogram can be converted to a cumulative distribution function (CDF).

Figure 3:
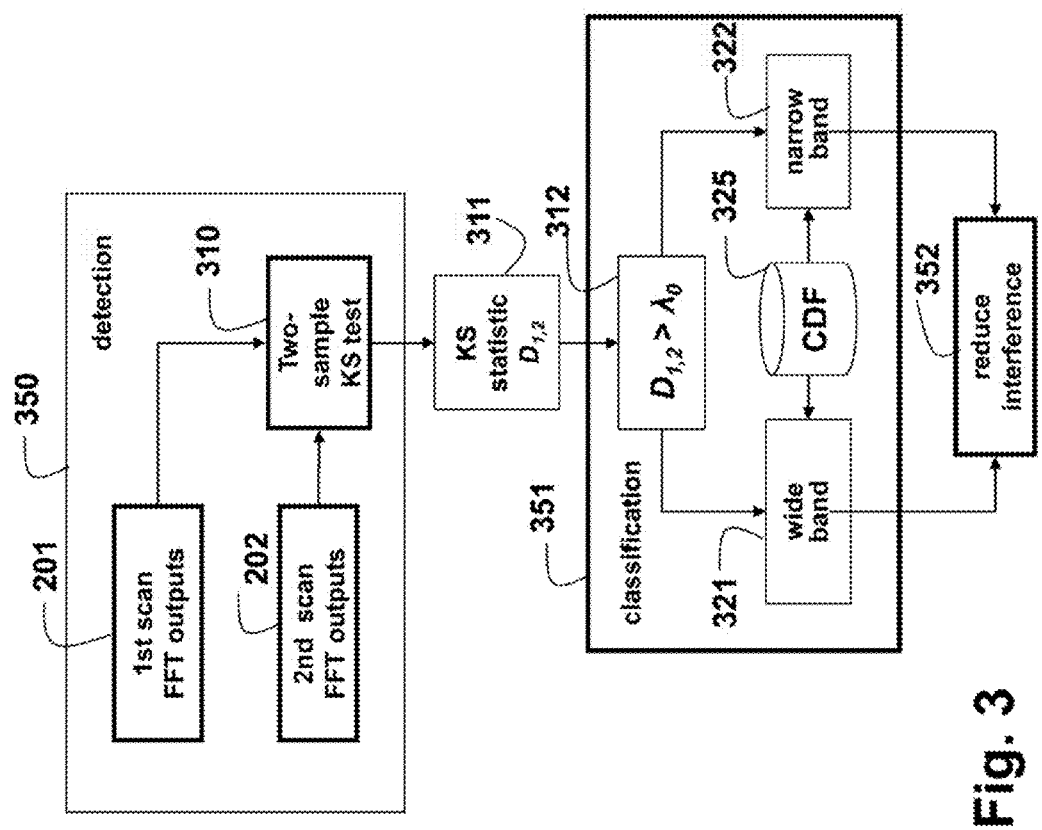
FIG. 3 is a flow chart of a method for detecting, classifying and reducing interference according to embodiments of the invention.

FIG. 3 shows the method for interference detection 350, classification 351 and reduction 352. During the detection, a two-sample Kolmogorov-Smirnov (K-S) test 310 is applied to first and second periodograms 201-202 obtained during two consecutive scans to determine a first statistic $D_{1,2}$ (distance) 311. Because the test is non-parametric and distribution free, no prior knowledge of the statistical distribution of the interference is required.

The classification compares 312 the first statistic $D_{1,2}$ to a threshold $\lambda_0$. If the statistic is less than the threshold, then the interference is probably wideband 321, and otherwise the interference is likely narrowband 322. In either case, one of the periodograms is compared with the CDFs 325 of known interferences to obtain second statistics $D_3$ which are further processed as describe below with reference to FIG. 4 before the appropriate interference reduction 352 is applied.

Periodograms

Figure 7:
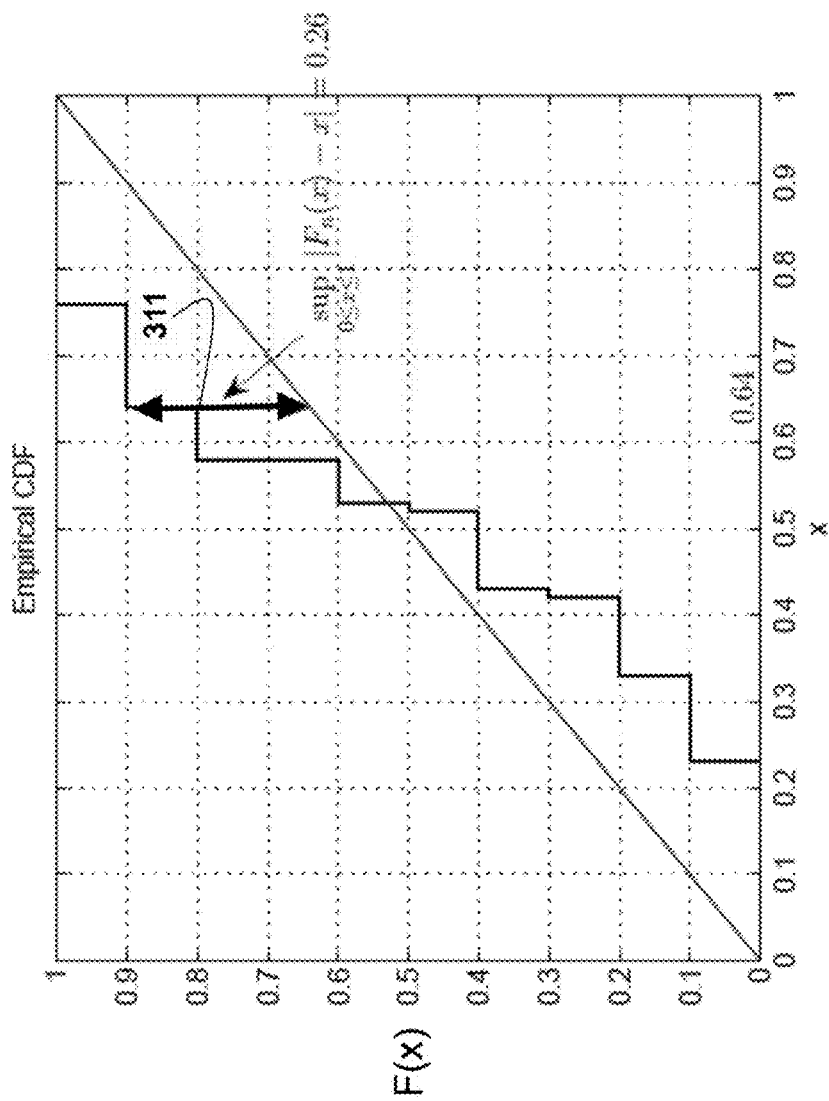
FIG. 7 is a graph of a distance between the two consecutive empirical distributions according to embodiments of the invention.

First and second periodograms ($\tilde{X}_1 = \{\tilde{x}_1^1, \ldots, \tilde{x}_N^1\}$, $\tilde{X}_2 = \{\tilde{x}_1^2, \ldots, \tilde{x}_N^2\}$) represent the outputs 201-202 of the first and second scans. Ordered periodograms are $X_1 = \{x_1^1, \ldots, x_N^1\}$ and $X_2 = \{x_1^2, \ldots, x_N^2\}$, such that $x_1^1 \leq x_2^1 \leq \ldots \leq x_N^1$ and $x_1^2 \leq x_2^2 \leq \ldots \leq x_N^2$. Based on $X_1$ and $X_2$, we construct two empirical distributions $$F^1(x) = \frac{1}{N} \sum_{k=1}^{N} U(x - x_k^1), \forall k \text{ and } F^2(x) = \frac{1}{N} \sum_{k=1}^{N} U(x - x_k^2), \forall k,$$

where U(.) denotes a unit step function. The statistic (distance) 311 of the two consecutive empirical distributions, as shown in FIG. 7, is $$D_{1,2} \equiv \sup_{-\infty < x < \infty} |F^1(x) - F^2(x)|,$$

where sup is a supreme function.

The result of the KS test is $$\lim_{N \to \infty} Pr\left(\sqrt{\frac{N^2}{2N}} D_{1,2} < \lambda\right) = Q(\lambda)$$

where $$Q(\lambda) = \sum_{r=-\infty}^{\infty} (-1)^r e^{-2r^2 \lambda^2},$$

and wherein Pr(.) denotes the probability, r represent an integer value, and $\lambda$ represents a given threshold.

For the first statistic $D_{1,2}$, the two-sample $\alpha$-level KS test is $$\begin{cases} F^1(x) \neq F^2(x), \text{ if } D_{1,2} \geq \lambda_0 \sqrt{2/N} \\ F^1(x) = F^2(x), \text{ if } D_{1,2} \geq \lambda_0 \sqrt{2/N} \end{cases},$$

where $Q(\lambda_0) = 1 - \alpha$. Using the first two terms of $$Q(\lambda) = \sum_{r=-\infty}^{\infty} (-1)^r e^{-2r^2 \lambda^2}$$

and $r=0$ and $r=1$, we can have a threshold $\lambda_0 \approx \sqrt{0.34657 - 0.5\log(\alpha)} \sqrt{2/N}$. If the statistic $D_{1,2}$ is greater than $\lambda_0$, then the interference is probably narrowband interference, and otherwise, broadband.

However, a very small statistic may indicate that there is indeed no interference at the time of scan, or there may be continued interference that did not cause a change of state between the two consecutive scans. This condition is caused by a long lasting continuous interference source, see FIG. 5. In either case, the classification is used to reach a better decision, e.g. whether the interference is caused specifically by, e.g., a microwave oven (MWO) or a cordless telephone (CP).

Figure 5:
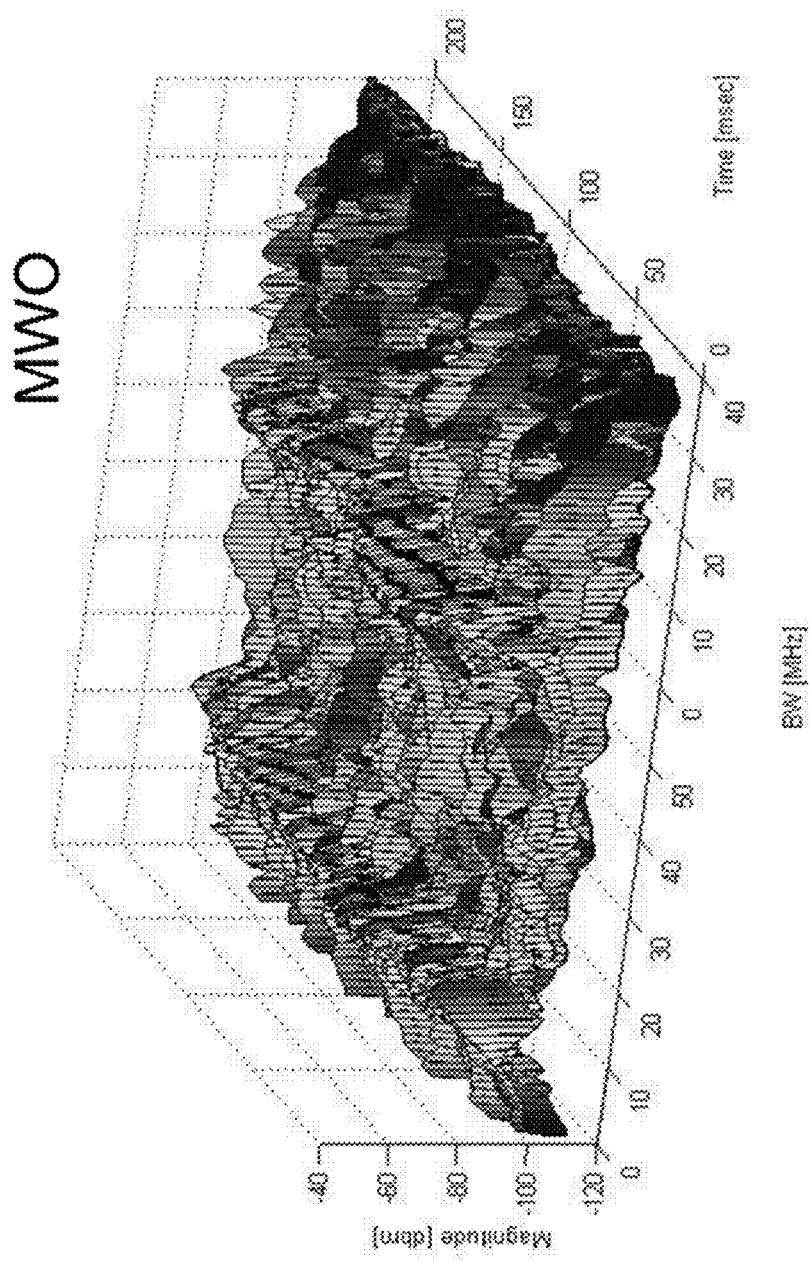
FIG. 5 is a graph of example wideband interference according to embodiments of the invention.
Figure 6:
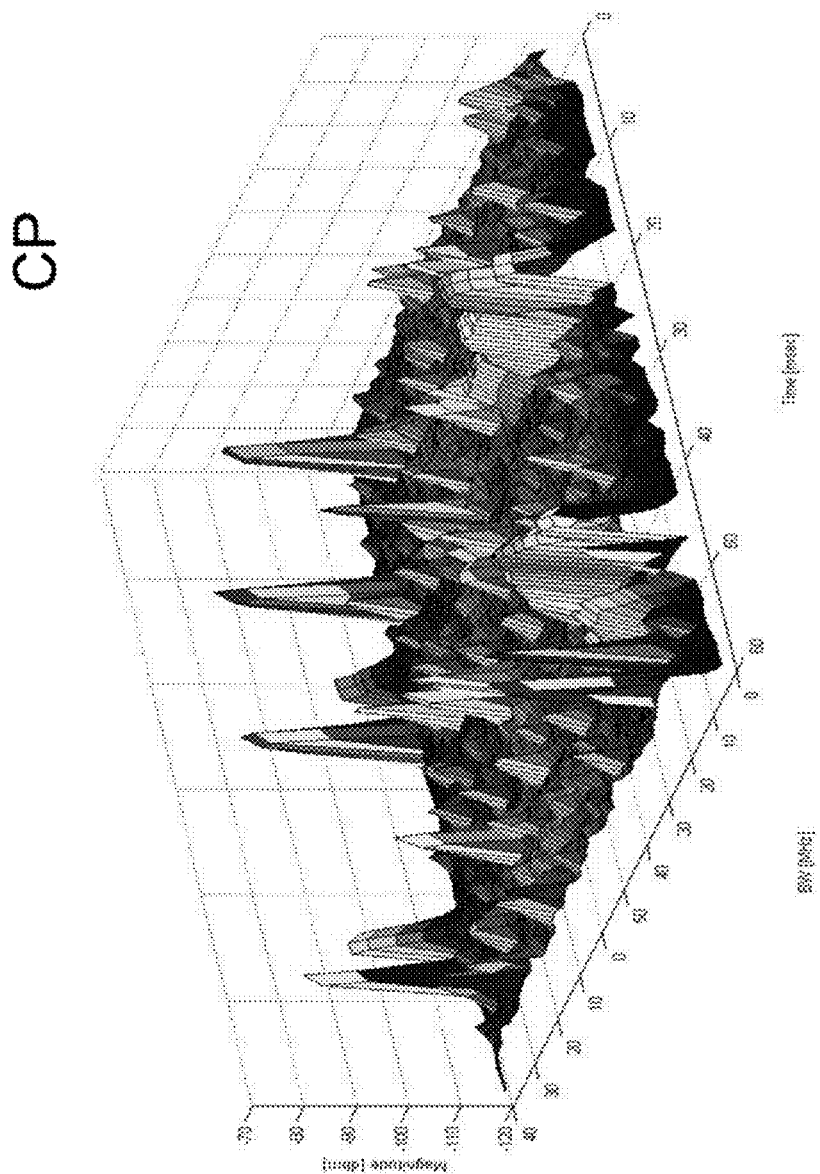
FIG. 6 is a graph of example narrowband interference according to embodiments of the invention.

FIGS. 5 and 6 respectively show the interfering signal from a typical microwave oven and cordless phone as a function of magnitude, time and bandwidth. As can be seen, the MWO interference is more "continuous" in all dimensions, while the CP interference is more spiked and short term, since the transmissions are concentrated in both time and frequency.

Figure 4:
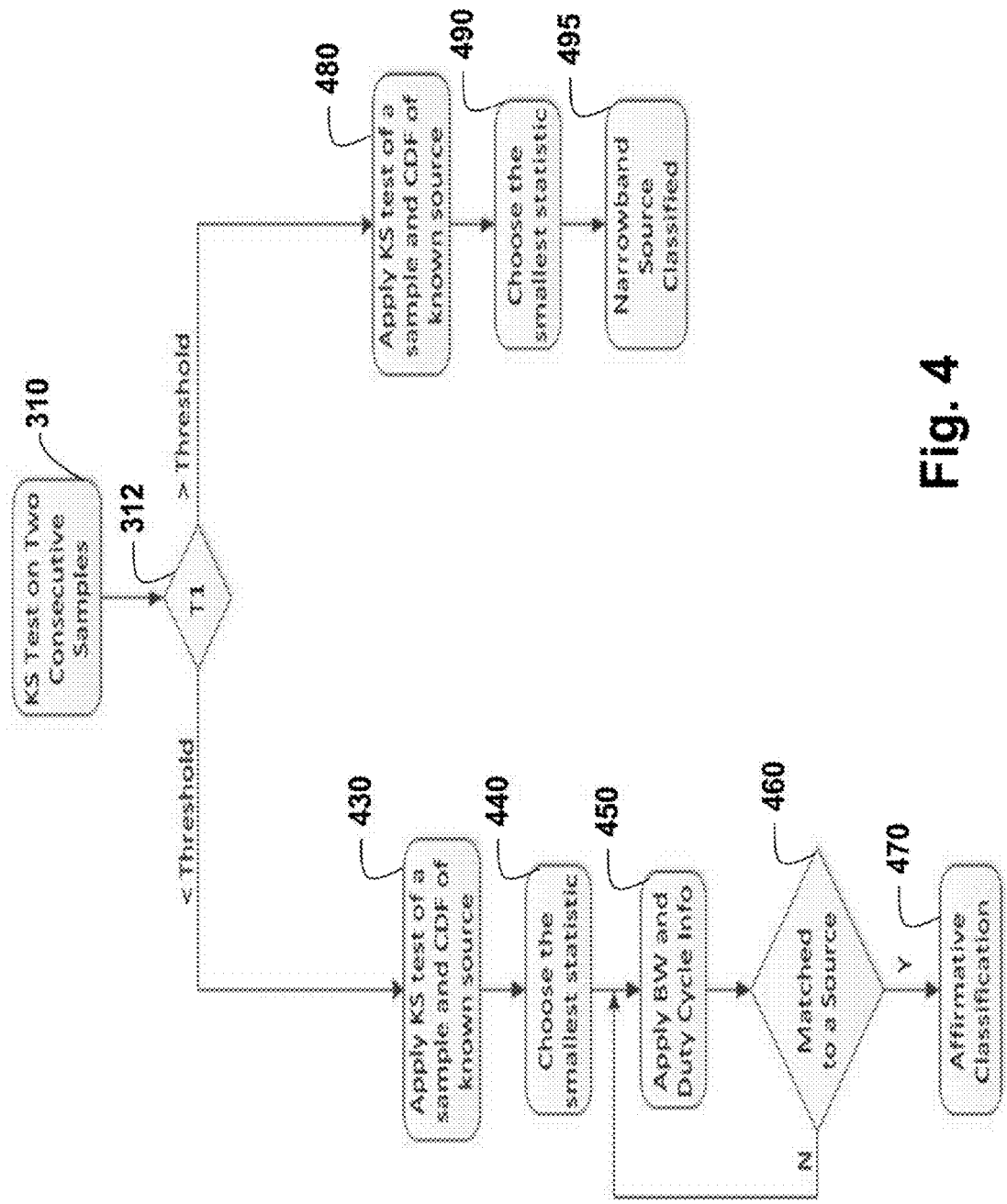
FIG. 4 is a flow chart of a classification stage of the method of FIG. 3.

FIG. 4 shows the classification in greater detail. For wideband, the two-sample KS test 430 is applied by comparing one of the two periodograms used during detection with the CDFs to produce the second statistics $D_3$ 340. The smallest statistic is selected 440, and additional information, such as the bandwidths (BW) and duty cycles associated with the CDF of the smallest statistic can be used to iteratively match 460 to a specific interfering source to affirm 470 the classification before the wideband interference is reduced using known techniques.

For narrowband interference, the KS test 480 is applied by comparing one of the two periodograms used during detection with the CDFs to produce the second statistics $D_3$. The CDF with smallest statistic is selected 440 to affirm the narrowband interference 495 before the narrowband interference is reduced using known techniques The invention offers a flexible, efficient, and low-cost method for detection and classification of interference signals. In an environment with non-significant interference, the first stage KS test may suffice. That low-cost and efficient test allows maximum network resources, i.e., bandwidth, processing power, storage, etc., be utilized for actual communications. After the detection of significant interference, the classification can be performed. This offers a flexible trade-off between the scanning periods and durations while satisfying the pre-defined minimum performance requirements. These tests mainly rely on analyzing the changes in the state of the channel without applying complicated and exhaustive signal processing techniques.

The steps of the method as shown in FIGS. 3 and 4 can be performed in a processor connected to memory, e.g., the database of CDFs, and input/output interfaces as known in the art.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for detecting interference in a channel of a wireless network, comprising:

applying a two-sample Kolmogorov-Smirnov (KS) test to first and second periodograms obtained during two consecutive scans of the channel to a obtain a first statistic; and classifying the interference as wideband or narrow band by comparing the first statistics to a threshold, wherein the steps are performed in a processor.

2. The method of claim 1, wherein the periodograms are obtained by applying a fast Fourier transform to the scans.

3. The method of claim 1, wherein the wireless network is a local area network.

4. The method of claim 1, further comprising;

reducing the interference according to the classifying.

5. The method of claim 1, wherein the interference is wideband and further comprising:

applying the two-sample KS test to one of the periodograms and cumulative distribution functions (CDFs) of known interfering signals to obtain second statistics;

selecting a smallest of the second statistics; and applying iteratively bandwidth and duty cycle information associated with the CDFs to affirm the classification.

6. The method of claim 1, wherein the interference is narrowband and further comprising:

applying the two-sample KS test to one of the periodograms and cumulative distribution functions of known interfering signals to obtain second statistics;

selecting a smallest of the second statistics to affirm the classification.

7. The method of claim 5 or 6, further comprising:

converting the periodograms to corresponding cumulative distribution functions.

* * * * *